Figure 3:
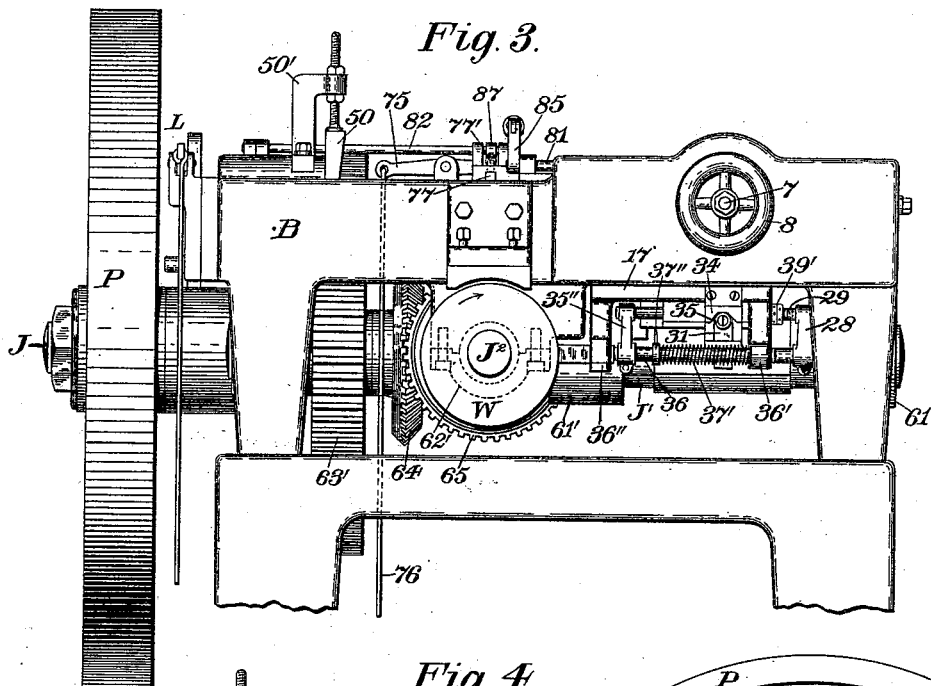

(No Model.) 10 Sheets—Sheet 1.
C. C. TYLER.
MACHINE FOR MAKING MILLING CUTTERS.
No. 551,066. Patented Dec. 10, 1895.
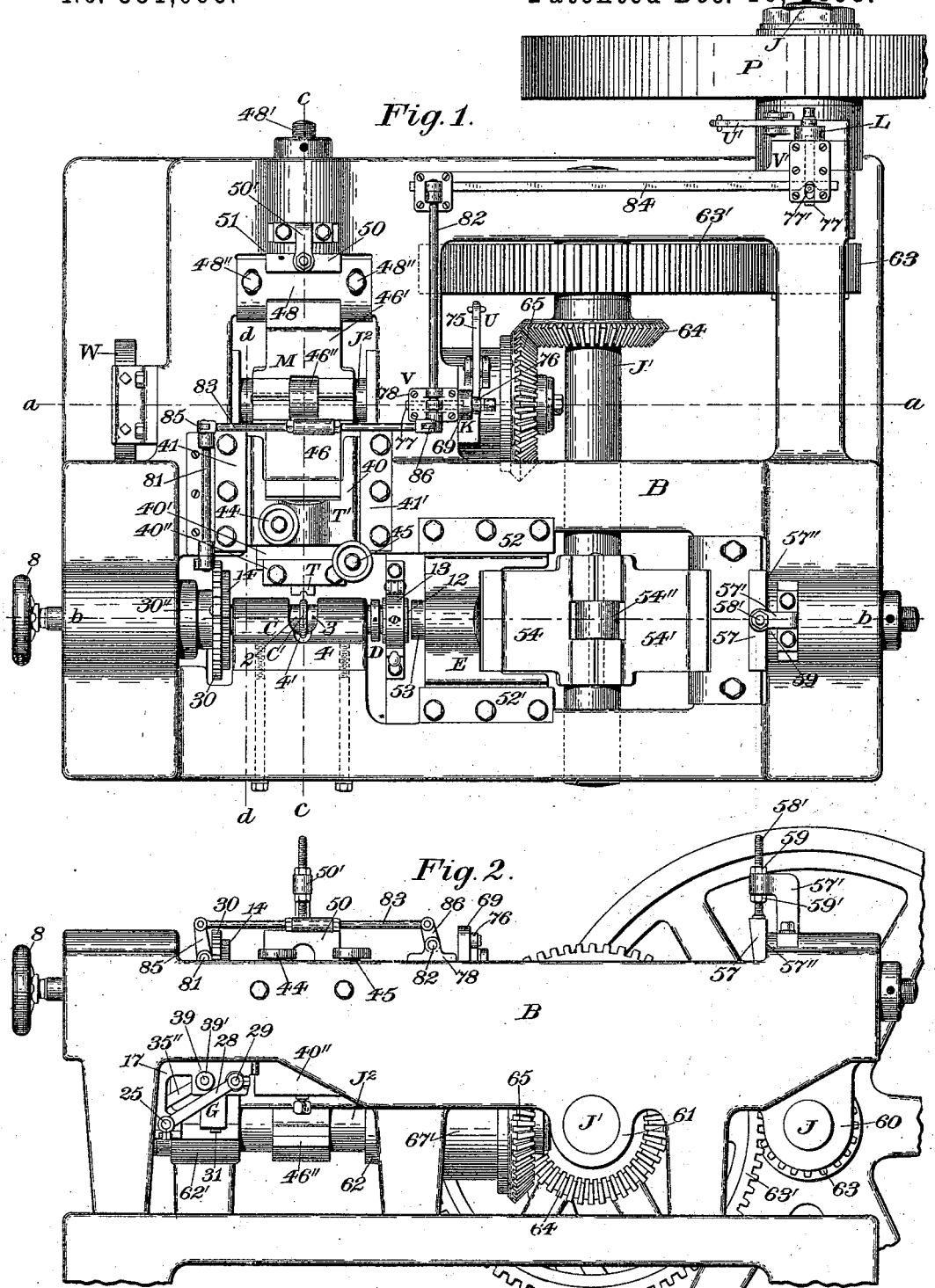
Witnesses:
J. L. Edwards Jr.
Fred. J. Dole.
Inventor
Charles C. Tyler.
By his Attorney,
F. A. Richards.

(No Model.) 10 Sheets—Sheet 2.

C. C. TYLER.
MACHINE FOR MAKING MILLING CUTTERS.

No. 551,066. Patented Dec. 10, 1895.

Witnesses:
J. L. Edwards Jr.
Fred. J. Dole.

Inventor:
Charles C. Tyler.
By his Attorney,
F. H. Richards (No Model.) 10 Sheets—Sheet 3.
C. C. TYLER.
MACHINE FOR MAKING MILLING CUTTERS.

No. 551,066. Patented Dec. 10, 1895.

Witnesses:
J. L. Edwards Jr.
Fred. J. Dole.

Inventor:
Charles C. Tyler,
By his Attorney,
F. H. Richards.

(No Model.) 10 Sheets—Sheet 4.
C. C. TYLER.
MACHINE FOR MAKING MILLING CUTTERS.
No. 551,066. Patented Dec. 10, 1895.

Witnesses:
J. L. Edwards Jr.
Fred. J. Dole.

Inventor:
Charles C. Tyler.
By his Attorney,
F. H. Richards.

(No Model.)　　　　　　　　　　　　　　　　10 Sheets—Sheet 5.
C. C. TYLER.
MACHINE FOR MAKING MILLING CUTTERS.
No. 551,066.　　　　　　　　　　　Patented Dec. 10, 1895.

Witnesses:
J. L. Edwards Jr.
Fred. J. Dole.

Inventor:
Charles C. Tyler.
By his Attorney,
F. H. Richards.

(No Model.) 10 Sheets—Sheet 7.
C. C. TYLER.
MACHINE FOR MAKING MILLING CUTTERS.

No. 551,066. Patented Dec. 10, 1895.

Witnesses:
J. L. Edwards Jr.
Fred. J. Dole.

Inventor:
Charles C. Tyler.
By his Attorney,
F. H. Richards.

(No Model.) 10 Sheets—Sheet 8.
C. C. TYLER.
MACHINE FOR MAKING MILLING CUTTERS.
No. 551,066. Patented Dec. 10, 1895.
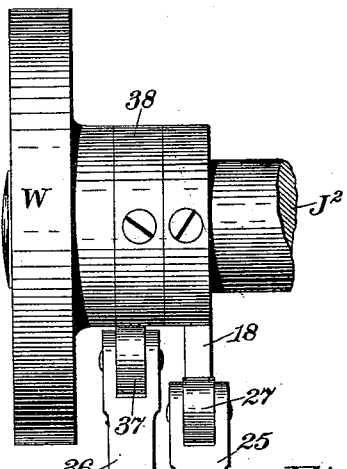
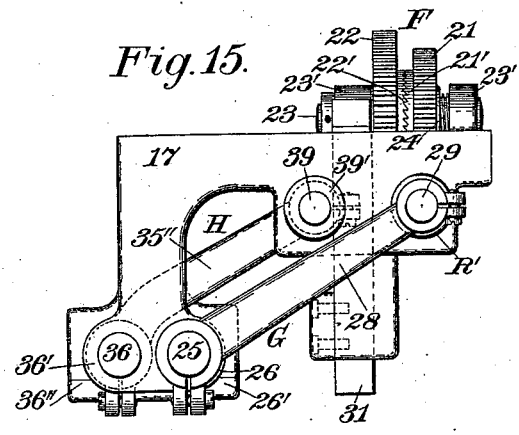
Fig. 14.
Fig. 15.
Fig. 16.
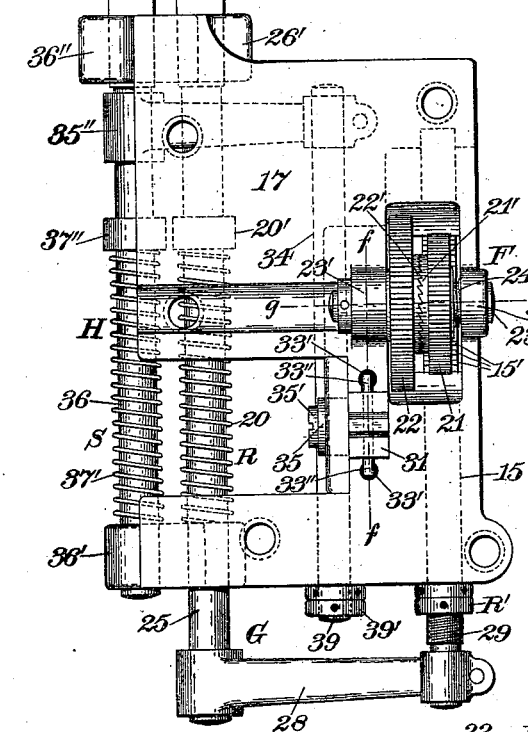
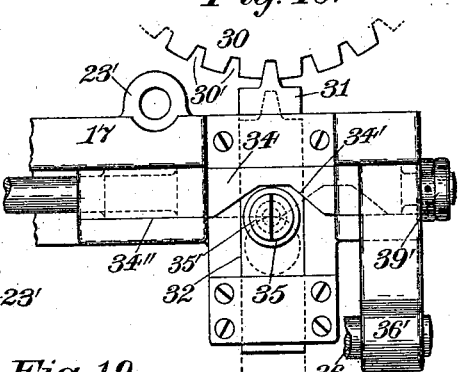
Fig. 19.
Fig. 17.
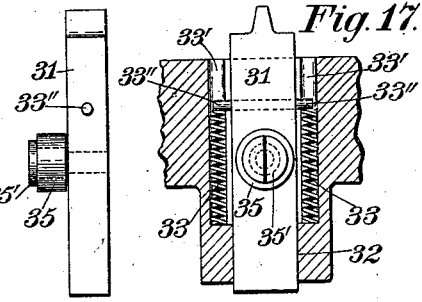
Fig. 18.
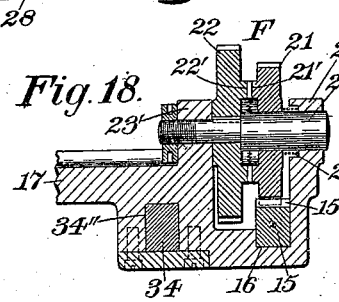
Witnesses:
J. L. Edwards Jr.
Fred. J. Dole.
Inventor:
Charles C. Tyler.
By his Attorney,
F. H. Richards.

(No Model.) 10 Sheets—Sheet 9.

C. C. TYLER.
MACHINE FOR MAKING MILLING CUTTERS.

No. 551,066. Patented Dec. 10, 1895.

Witnesses:
J. L. Edwards Jr.
Fred. J. Dole.

Inventor:
Charles C. Tyler:
By his Attorney,
F. H. Richards.

(No Model.)   C. C. TYLER.   10 Sheets—Sheet 10.
MACHINE FOR MAKING MILLING CUTTERS.

No. 551,066.   Patented Dec. 10, 1895.

Witnesses:
J. L. Edwards Jr.
Fred. J. Dole.

Inventor:
Charles C. Tyler.
By his Attorney,
F. H. Richards.

UNITED STATES PATENT OFFICE.

CHARLES C. TYLER, OF HARTFORD, CONNECTICUT.

MACHINE FOR MAKING MILLING-CUTTERS.

SPECIFICATION forming part of Letters Patent No. 551,066, dated December 10, 1895.

Application filed April 1, 1895. Serial No. 543,985. (No model.)

*To all whom it may concern:*

Be it known that I, CHARLES C. TYLER, a citizen of the United States, residing at Hartford, in the county of Hartford and State of Connecticut, have invented certain new and useful Improvements in Machines for Making Milling-Cutters, of which the following is a specification.

This invention relates to machines for making milling-cutters and is somewhat in the nature of an improvement upon the machine for making milling-cutters shown and described in Letters Patent of the United States No. 435,574, granted to me September 2, 1890, to which reference may be had.

One of the principal objects of my present invention is to provide an automatic machine of the class specified of improved construction and organization and especially adapted for making milling-cutters of the class described in my prior patent, No. 435,572, and substantially after the method disclosed in Patent No. 408,446 heretofore granted to me, and to do this with extreme precision, with great rapidity, and at a low cost of manufacture.

Another object of my invention is to furnish an improved automatic machine of the class specified having an intermittently-rotative cutter-blank carrier embodying a cutter-blank clamp; indexing feed mechanism in operative connection with the cutter-blank carrier and adapted for intermittently rotating said carrier; two independently-operable and differentially-effective clamp-closers, one of which is normally continuously effective for holding the blank under given pressure and the other of which is intermittently reciprocative for augmenting the clamping pressure upon the blank; an intermittently-reciprocative tooth-forming compressor-tool in position and adapted for compressing successive tooth-forming peripheral portions of the cutter-blank and actuating mechanism co-operatively connecting the cutter-blank clamp, the intermittently - reciprocative clamp-closer, and the compressor-tool, and adapted for automatically and successively actuating said elements in the respective order thereof named, whereby during the operation of the machine the cutter-blank will first be rotated an aliquot part of a complete rotation; next, clamped at opposite sides thereof and locked against accidental rotation; next, acted upon by the compressor-tool to form a tooth therein, and next unlocked to permit another rotation of said blank, all of which will be hereinafter more fully described.

Another object of my present invention is to provide, in connection with an intermittently-rotative cutter-blank carrier embodying a blank-clamp in a machine of the class specified, a carrier actuating or indexing mechanism and a carrier-locking mechanism in co-operative relation and alternately and reciprocally operable the one relatively to the other, and adapted the former for automatically and intermittently rotating the cutter-blank carrier and clamp an aliquot part of a complete rotation at each operation thereof, and the latter for automatically and intermittently locking and releasing the carrier and clamp intermediate to intermittent rotation thereof, and also to provide an intermittently - reciprocative clamp - closer in position and adapted for clamping and releasing, reciprocally, the blank at opposite sides thereof or substantially at right angles to the direction of the path of movement of said cutter-blank, and means for automatically actuating said intermittently-reciprocative clamp-closer.

Another object of my invention is to provide, in connection with the cutter-blank carrier and clamp, in a machine of the class specified two differentially-effective clamp-closing devices, one of which is normally continuously effective for closing the clamp and for holding the blank against rotation relatively to the carrier, and the other of which is intermittently effective for further closing said clamp, and one of which clamp-closers is carried by and rotates with the clamp, and the other of which clamp-closers is non-rotative and has a reciprocative movement relatively to said clamp, all of which will be hereinafter more fully described.

Figure 4:
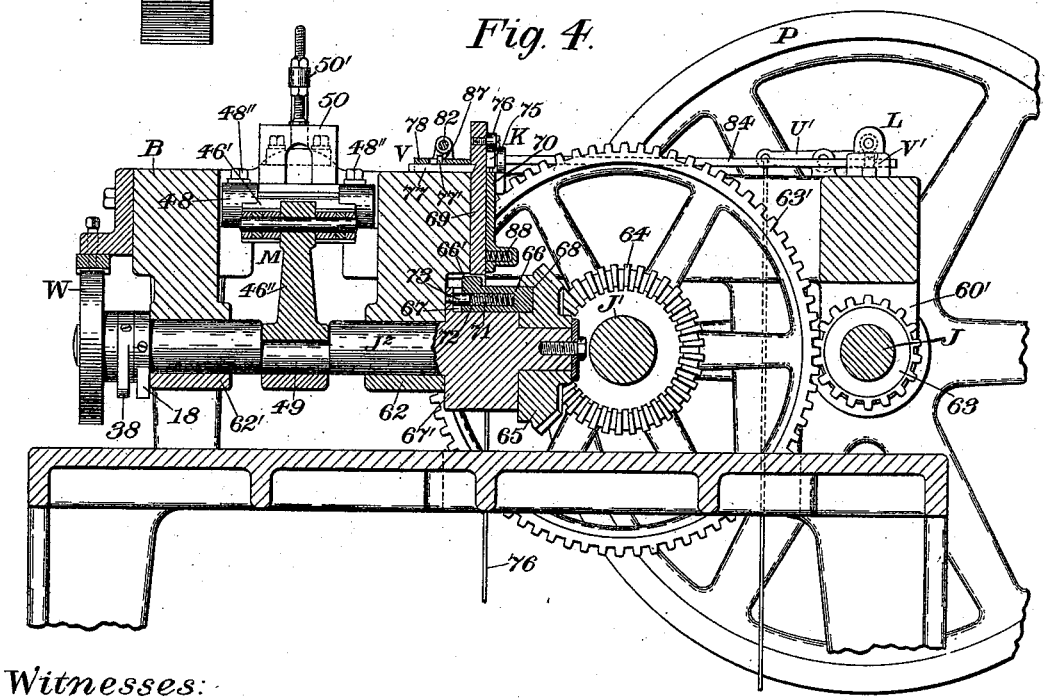
Figure 5:
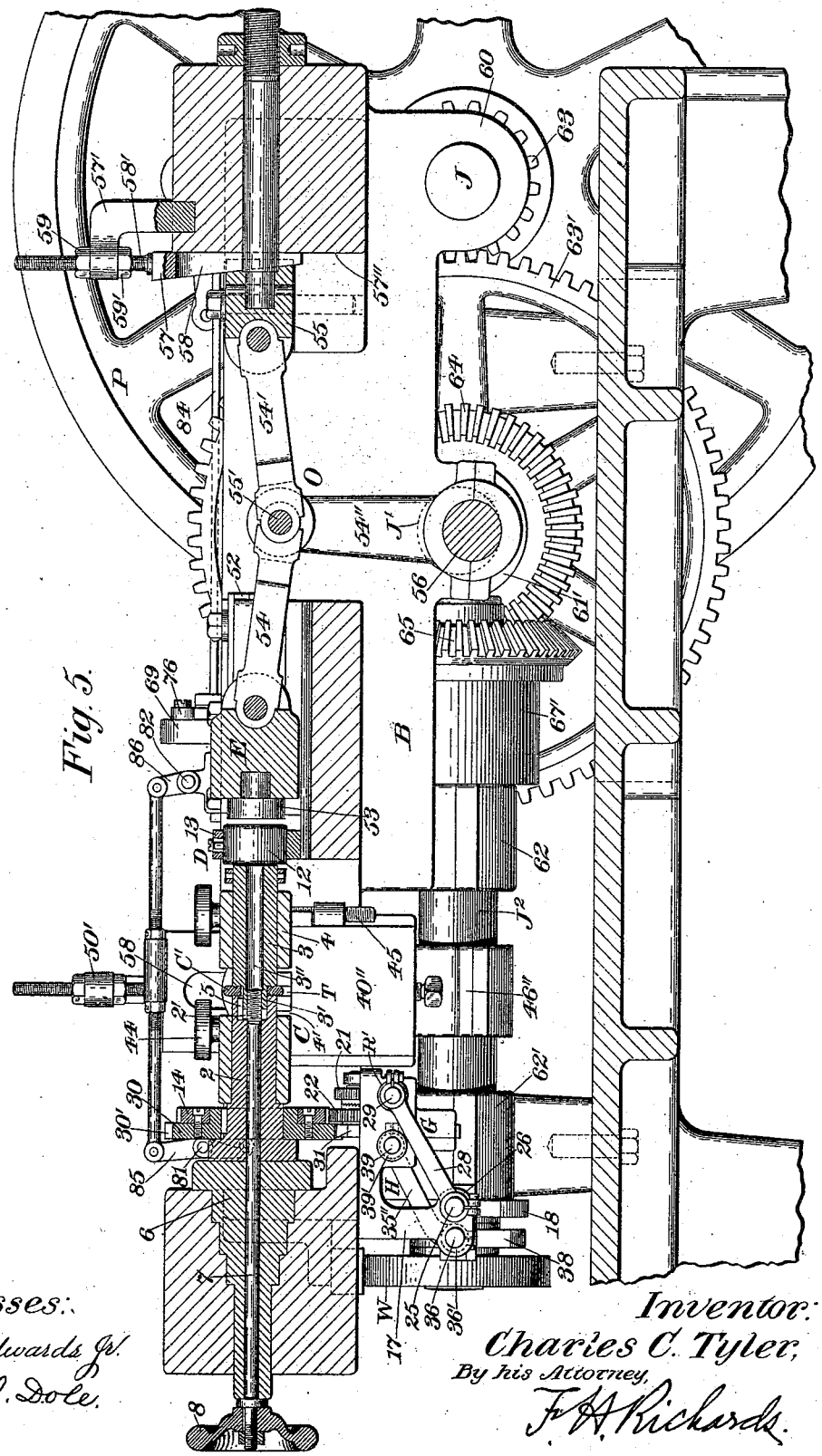
Figure 6:
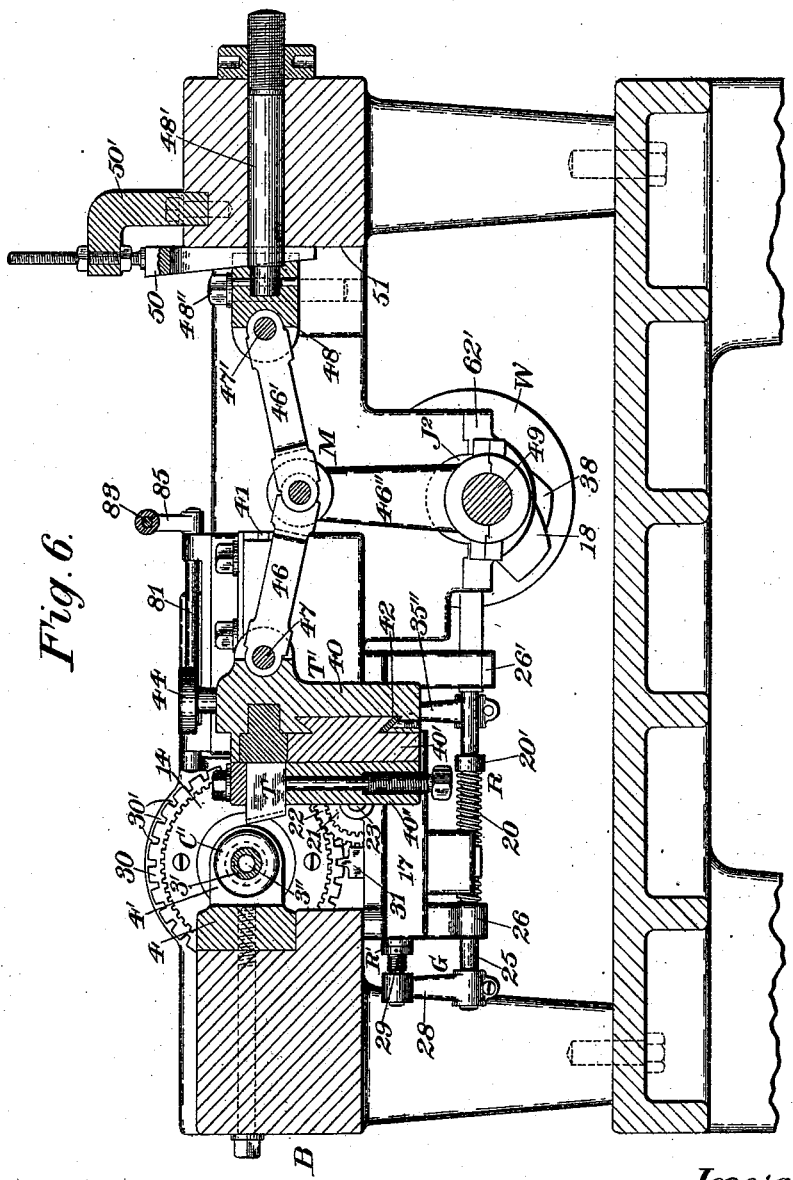
Figure 7:
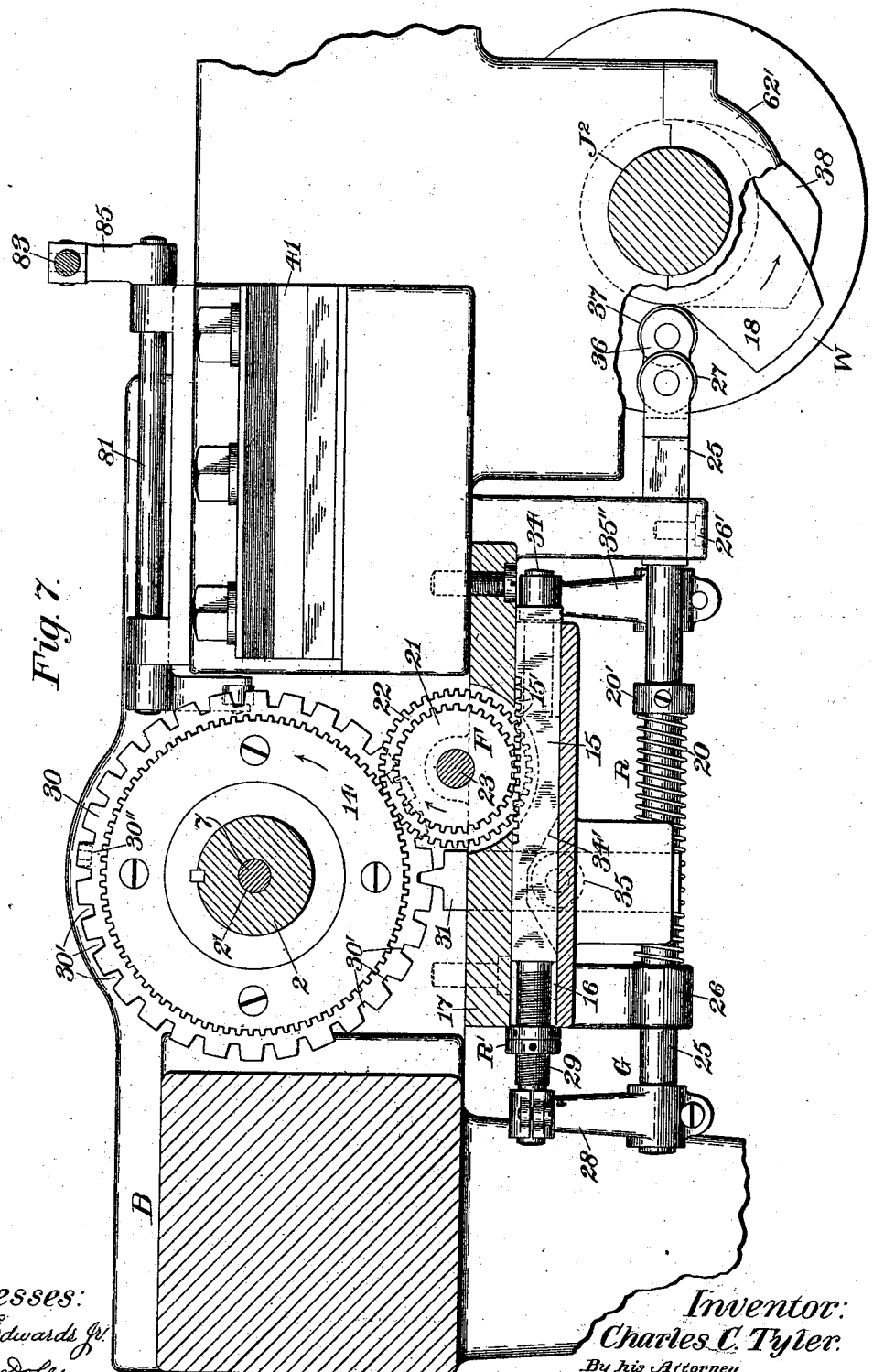
Figure 8:
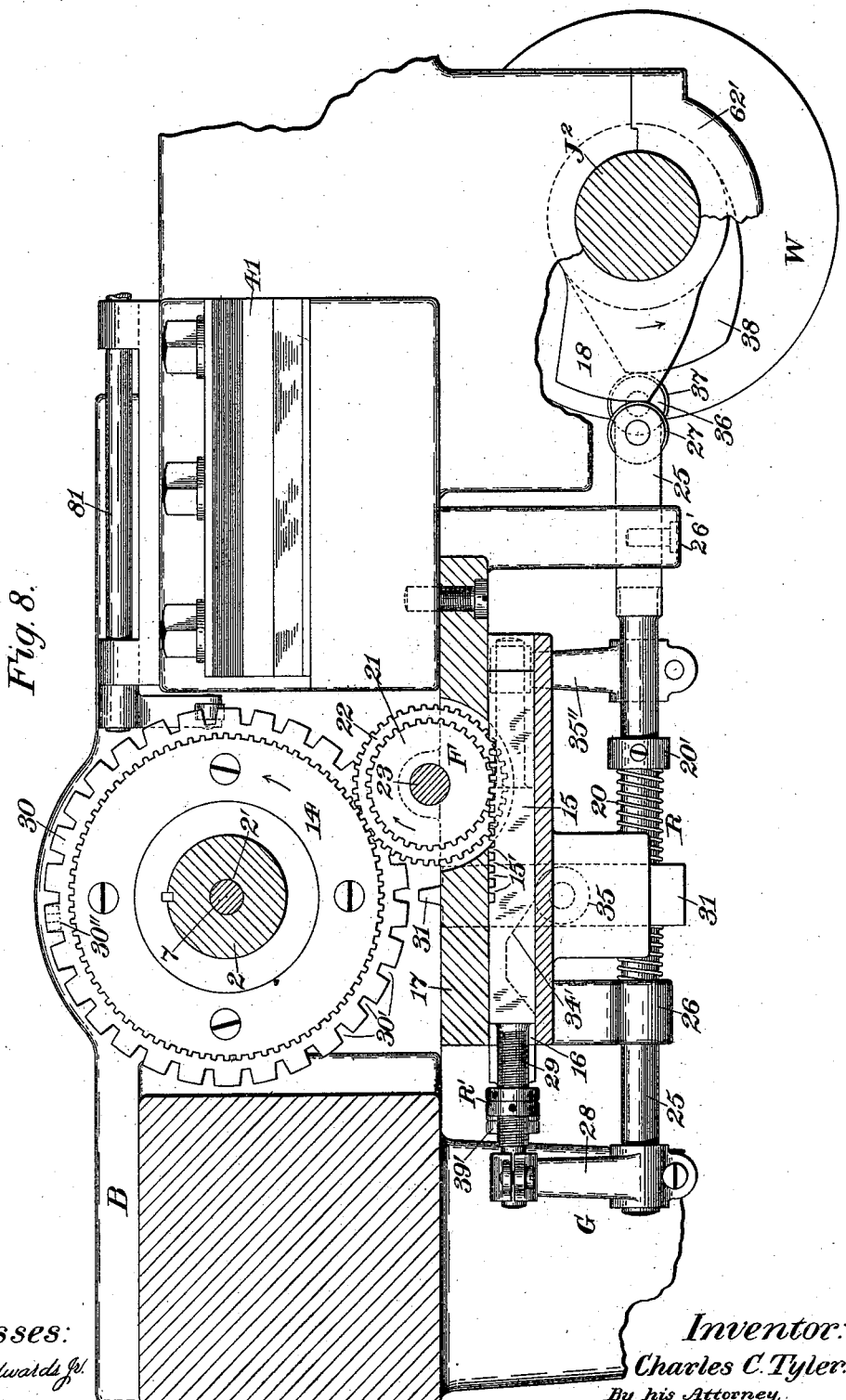
Figure 9:
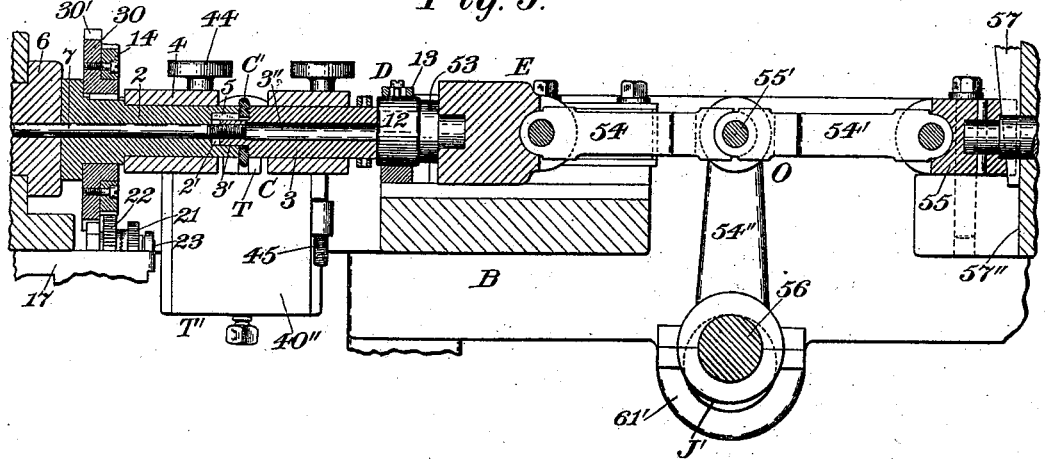
Figure 10:
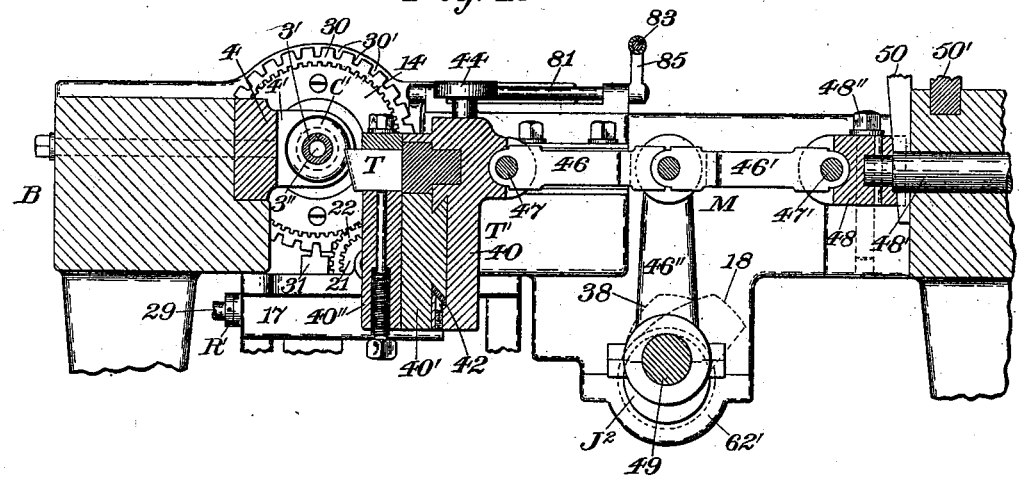
Figures 11, 12:
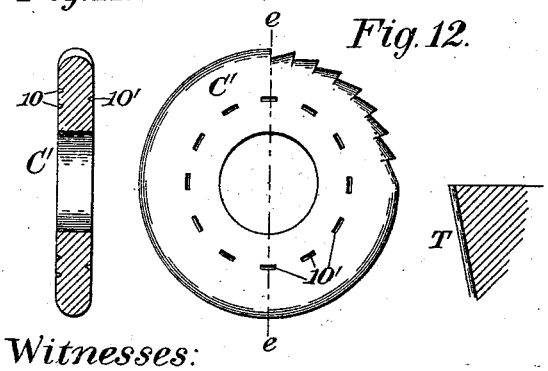
Figure 13:
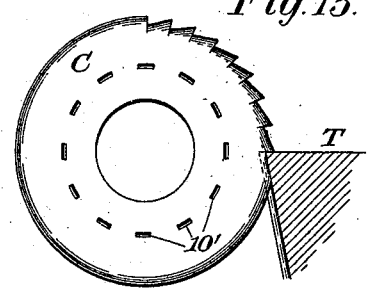
Figure 22:
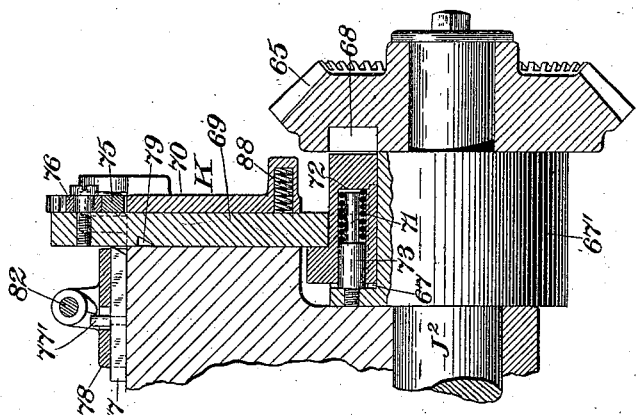
Figures 21, 23, 24:
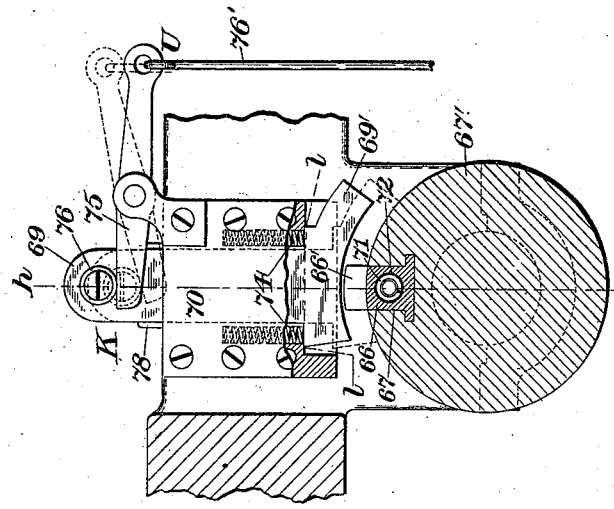
Figure 20:
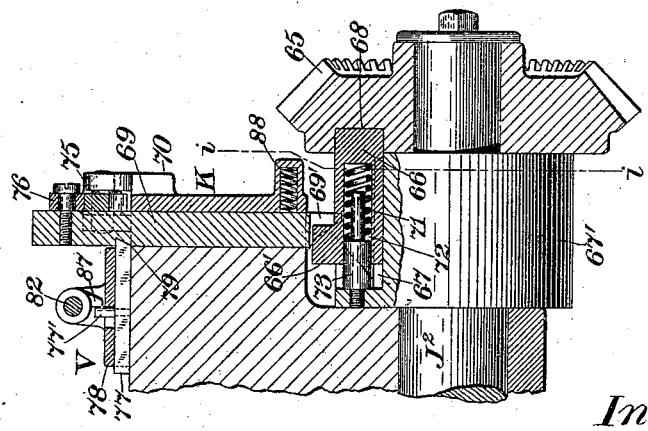
Figure 25:
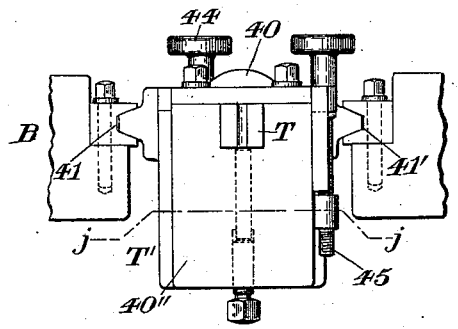
Figure 27:
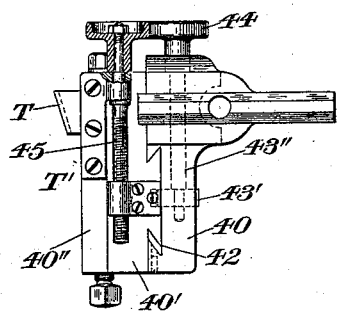
Figure 26:
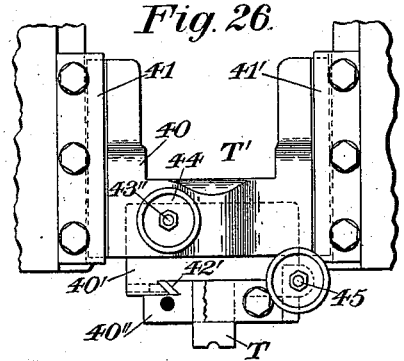
Figure 29:
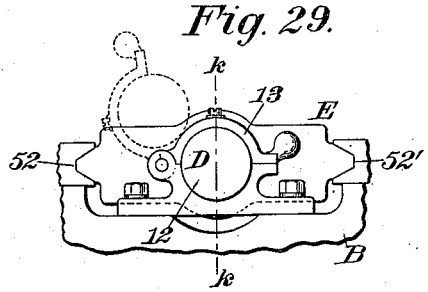
Figure 28:
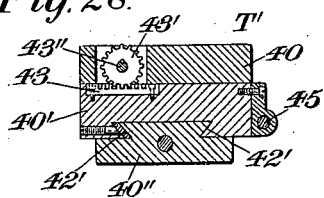
Figure 30:
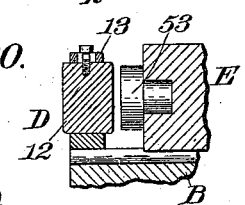
Figure 31:
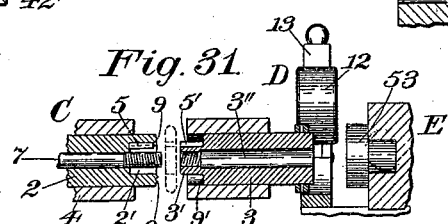

In the drawings accompanying and forming part of this specification, Figure 1 is a plan view on a relatively small scale of a machine for making milling-cutters embodying my present invention, said figure showing a cutter-blank held in position to be operated upon, and also showing the tooth-forming compressor-tool and the reciprocative clamp-closer in their retracted positions, respectively. Fig. 2 is a side elevation of a portion of the machine as seen from the under side in Fig. 1. Fig. 3 is an end view of the machine as seen from the left hand in Fig. 2. Fig. 4 is a vertical longitudinal section of the machine, taken in dotted line $a\ a$, Fig. 1, and looking toward the upper side of said figure. Fig. 5 is a vertical longitudinal section of the machine on a relatively large scale, taken in dotted line $b\ b$, Fig. 1, looking toward the upper side of said figure, said figure showing the intermittently-operable clamp-closer in the retractive or ineffective position. Fig. 6 is a vertical cross-section of the machine, drawn on the same scale as Fig. 5 and taken in dotted line $c\ c$, Fig. 1, looking toward the left hand in said figure. Fig. 6 shows the compressor-tool and its actuator in their retracted or ineffective positions. Fig. 7 is a vertical cross-section of a portion of the machine, drawn upon a relatively large scale as compared with Figs. 5 and 6 and taken in dotted line $d\ d$, Fig. 1, looking toward the left hand in said figure and showing the feeding and locking mechanism in one position thereof, the blank-carrier being shown locked against rotation and the feed mechanism being in its ineffective or inactive position. Fig. 8 is a similar view of that portion of the machine shown in Fig. 7, showing the blank-carrier feeding and locking mechanisms in positions different from that shown in Fig. 7. The locking member and actuating member are shown in this figure in their retracted and advanced positions, respectively, and the blank-carrier is shown unlocked. Fig. 9 is a vertical longitudinal section, similar to Fig. 5, of a portion of the machine, showing the intermittently-operable clamp-closer in its advanced or clamp-closing position. Fig. 10 is a vertical cross-section similar to Fig. 6, showing the tooth-forming compressor-tool and its actuator in their advanced or operative positions relatively to the cutter-blank. Fig. 11 is a cross-sectional view taken in dotted line $e\ e$, Fig. 12, looking toward the left hand in said figure and showing upon a large scale a partially-toothed cutter-blank adapted to be made by my improved machine. Fig. 12 is a face view of a partially-completed milling-cutter, such as shown in Fig. 11, and shows a portion of a tooth-forming compressor-tool in position for operating upon the periphery of the cutter-blank, said figures showing the compressor-tool in the retracted position thereof shown in Fig. 5. Fig. 13 is a view similar to Fig. 12, showing a partially-toothed milling-cutter blank and a compressor-tool in working engagement therewith, said figure illustrating the operation of the compressor-tool in forming a tooth by compressor. Fig. 14 is a plan view of a portion of the blank-carrier feeding and locking mechanism detached, the feed-wheel and the locking-wheel carried by the blank-carrier and which constitutes a part of the feeding and locking mechanism not being shown. Fig. 15 is an end elevation of a portion of the feeding and locking mechanism shown in Fig. 14 and is seen from the lower side in said Fig. 14. Fig. 16 is a side elevation of a portion of the feeding and locking mechanism as seen from the left hand in Fig. 14, parts thereof being broken away to more clearly illustrate the operation of the locking members, said figure also showing the portion of the locking-wheel of said mechanism. Fig. 17 is a vertical cross-section taken in dotted line $f\ f$, Fig. 14, and shows a portion only of the blank-carrier locking mechanism, this figure simply showing the locking-bolt, a portion of the carrying-frame therefor, and the spring-actuator in connection therewith. Fig. 18 is a vertical cross-sectional view taken in dotted line $g\ g$, Fig. 14, and shows a portion of a blank-feeding mechanism and blank-locking mechanism. Fig. 19 is a side view of a locking-bolt detached. Fig. 20 is a vertical section on a relatively large scale taken in dotted line $h\ h$, Fig. 21, looking toward the right hand in said figure and showing a portion of the framework of the machine, one of the shafts of the driving mechanism, a gear-wheel rotatively carried upon said shaft, and a clutch device intermediate to said gear-wheel and shaft and adapted for effecting a locked engagement between said wheel and shaft, said figure showing the locking member of the clutch device in position for effecting a locked engagement between the two rotative members of the driving mechanism. Fig. 21 is a cross-sectional view of the parts shown in Fig. 20, taken in dotted line $i\ i$ in said Fig. 20 and looking toward the left hand thereof. Fig. 22 is a vertical section similar to Fig. 20, showing the locking member of the clutch device in its retracted or unlocked position. Fig. 23 is a cross-section taken in dotted line $l\ l$, Fig. 21, looking downward in said figure. Fig. 24 is a plan view of the automatically-operable holdback for engaging the releasing device of the actuating member of the clutch device shown in Figs. 20, 21, and 22. Fig. 25 is a front elevation of a portion of the framework of a machine, together with the compressor-tool carrier and compressor-tool. Fig. 26 is a plan view of the parts shown in Fig. 25. Fig. 27 is a partly-sectional side elevation of the compressor-tool carrier and compressor-tool detached from the frame of the machine, as seen from the right hand in Fig. 25. Fig. 28 is a cross-sectional view of the compressor-tool carrier, taken in dotted line $j\ j$, Fig. 25, looking downward in said figure. Fig. 29 is an end view of the intermittently-reciprocative blank-closer and thrust-block in advance of said closer, said figure showing a portion of the frame of the machine and the slideway for said closer and the bearing for the thrust-block. Fig. 30 is a longitudinal section taken in dotted line $k\ k$, Fig. 29, and showing the parts illustrated in Fig. 29 as seen from the right hand in said figure; and Fig. 31 is a longitudinal section taken in dotted line b b, Fig. 1, upon a relatively large scale, showing a portion of the cutter-blank-carrying clamp in its released or open position, or in the position it occupies when removing or replacing a cutter-blank.

Like characters represent like parts in all the figures of the drawings.

In the preferred embodiment of my invention herein shown and described the machine for making milling-cutters comprises in part a suitable framework, (designated in a general way by B,) which may be of any suitable construction for carrying the working parts of the machine; an intermittently - rotative cutter-blank carrier, (designated in a general way by C,) and which embodies a cutter-blank clamp comprising two longitudinally-separable clamp members; an intermittently-effective feed mechanism or indexing mechanism in connection with and adapted for intermittently rotating the cutter-blank carrier a predetermined part of a complete rotation at each operation thereof; an intermittently-operable locking device controlled by the blank-carrier feed mechanism and adapted for operating alternately and reciprocally with the feed mechanism for locking and releasing the cutter-blank carrier; an intermittently-reciprocative compressor-tool carrier; means in connection with and adapted for intermittently reciprocating said compressor-tool carrier; a normally continuously-effective rotative blank-closer in connection with and adapted for closing the clamp with a given pressure and for continuously holding the blank against rotation relatively to the carrier during the successive tooth-forming operations of the compressor-tool; means for actuating said rotative closer; an intermittently-effective reciprocative blank-closer in position and adapted for intermittently further closing the clamp and augmenting the clamping pressure upon the cutter-blank and adapted for operating reciprocally with the compressor-tool carrier; means for automatically actuating the reciprocative blank-closer intermediate to successive effective strokes of the compressor-tool carrier; an adjusting device in connection with the tool-carrier mechanism and adapted for regulating the working stroke of the tool-carrier; an adjusting device in connection with and adapted for regulating the working stroke of the intermittently-reciprocative blank-closer; a clutch in connection with and adapted for controlling the operation of the tool-carrier-actuating mechanism; and a clutch in connection with and adapted for controlling the operation of the main driving mechanism and clutch-shifting mechanism in connection with said two clutches and with the blank-carrier feeding mechanism and adapted to be automatically operated by said blank-carrier feeding mechanism to automatically release said clutches at a predetermined point in the rotation of the cutter-blank carrier to stop the machine.

The cutter-blank carrier C, which is also in the nature of a clamping device and will in some instances be herein referred to as the "cutter-blank-carrying clamp," comprises, in the preferred form thereof herein shown, two axially - aligned clamping members (designated by 2 and 3, respectively) journaled intermediate of their outer ends in a horizontal bearing formed in the carrier-head 4, which is removably secured to the framework of the machine, said bearing being cut away at the middle portion thereof, as shown at 4', to afford space for placing the cutter-blank between the adjacent ends of the clamp members 2 and 3. The clamp member 3 of the blank-carrier is diametrically reduced at the inner end thereof adjacent to the clamp member 2, as shown at 3', to form a carrying-arbor for the cutter-blank C', and the inner end of the clamp member 2 is axially recessed, as shown at 2', to receive the arbor or reduced inner end 3' of the member 3. These two clamping members 2 and 3 are normally locked together, so as to rotate one with the other, preferably by means of a key 5, carried by one of said members, and which key enters a keyway 5' in the other of said members, as will be understood by reference to Figs. 5 and 31 of the drawings. The clamp member 2, which is axially bored throughout the entire length thereof, bears at its outer end against the inner end of an axially-bored bearing-block 6, which has at the outer end thereof a relatively large stepped bearing in the framework, as shown in Fig. 5. The clamp member 3, which has also a longitudinal axial bore, as shown at 3'', in register with the axial bore of the member 2, is supported for longitudinal as well as rotative movement in the bearing 4, but is normally held against longitudinal movement relatively to the longitudinally-fixed clamp member 2 preferably by means of a clamp-rod 7, which extends entirely through the axial bore 2' in the clamp member 2 and through the registering axial bore in the bearing-block 6. This clamp-rod 7, which for convenience may be herein termed a "main" or "rotative" clamp-closer, has a screw-threaded bearing at its inner end in the inner end of the shiftable clamp member 3, as will be understood by reference to Figs. 5 and 31 of the drawings, and the outer end of said clamp-rod or clamp-closer is preferably provided with a hand-wheel 8, having a bearing at the inner face of the hub thereof against the outer end face of the bearing-block 6. (See Figs. 1, 2, and 5.) This clamp-rod 7 constitutes a normally continuously-effective closer for the clamp members 2 and 3, said closer drawing the clamp member 3 inward to clamp the blank C' between the two members 2 and 3 and holding said blank against rotation relatively to the clamp members and with a given pressure, which pressure will when the machine is in operation be augmented by an intermittently-operable clamp-closer, as will be hereinafter more fully described.

The non-shiftable member and the shiftable member of the cutter-blank-carrying clamp will preferably have at the adjacent ends thereof cutter-blank-engaging flanges 9 and 9', respectively, adapted for entering or engaging in similarly-disposed recesses or notches 10 and 10', formed in the opposite side faces, respectively, of the cutter-blank C'. The longitudinally-shiftable clamp member 3 has a normal abutment at its outer end against a shiftable thrust-block 12, movably supported in axial alignment with the shiftable clamp member 3 in a journal-bearing box, (designated in a general way by D,) which bearing-box is fixed to the framework of the machine, as shown most clearly in Figs. 29 and 31 of the drawings.

As a convenient means for swinging or throwing the shiftable thrust-block, which thrust-block normally constitutes an abutment for the outer end of the shiftable clamp member 3 and which is adapted to be acted upon by an intermittently-reciprocative plunger E, that constitutes an auxiliary intermittently-reciprocative clamp-closer for augmenting the holding pressure exerted upon the cutter-blank and for further closing the clamp member, as will be hereinafter more fully set forth, out of the path of movement of the clamp member 3, which is necessary to permit a longitudinal movement of said member relatively to the member 2 for the purpose of removing the cutter-blank from between the clamp members 2 and 3 or replacing the cutter-blank between said members, the journal-box D has a hinged cap 13, to which the shiftable thrust-block 12 is movably connected, so as to be lifted by means of said cap out of the path of movement of the shiftable clamp member upon the opening movement of said cap, as will be understood by reference to Figs. 29 and 31 of the drawings.

For the purpose of removing a toothed cutter-blank and for the purpose of applying an untoothed blank between the clamp members 2 and 3 and in position to be operated upon by the tooth-forming compressor-tool, (designated by T,) assuming the parts to be in position shown in Figs. 1 and 5 of the drawings, the clamp-rod or rotative clamp-closer 7 will be turned to disconnect the two clamp members 2 and 3. The shiftable thrust-block will then be thrown into the position shown in dotted lines in Fig. 29 out of the path of movement of the shiftable clamp member 3. The shiftable clamp member 3 will then be retracted or shifted into the position shown in Fig. 31, which will separate the two clamp members 2 and 3 sufficiently to permit the removal of the cutter-blank C' from the blank-carrying arbor 3' of the clamp member 3, after which another blank may be replaced upon the arbor 3' and be brought into operative position by reversal of the operation just described, which will be understood by a comparison of Figs. 5 and 31 of the drawings.

As a means for periodically or intermittently imparting partial rotations successively to the cutter-blank carrier and as a means for periodically or intermittently locking the cutter-blank carrier against accidental movement intermediate to successive partial rotations thereof, I have provided, in connection with said cutter-blank carrier, an intermittently-operable cutter-blank feed mechanism or indexing mechanism in position and adapted for intermittently advancing said carrier and the cutter-blank a predetermined part of a complete rotation or a distance equivalent to the length of a tooth arc, and I have also provided a locking device or locking mechanism reciprocally operable and reciprocally effective relatively to said feed mechanism and in position and adapted for locking the cutter-blank carrier against accidental rotation immediately succeeding each successive partial rotation thereof or releasing each effective operation of the feed mechanism.

The feed mechanism in the preferred form thereof herein shown comprises, in part, a feed-wheel 14, secured to one member, as 2, of the cutter-blank-carrying clamp; an intermittently-operable feed-slide 15, which is in the nature of a reciprocative rack and is supported for horizontal reciprocation in a slideway 16, formed in the feed-mechanism-carrying-bracket 17, secured to the framework B of the machine below the cutter-blank-carrying clamp, as shown most clearly in Figs. 5, 6, 7, and 8 and in Figs. 14, 15, and 18 of the drawings; a transmission device (designated in a general way by F) intermediate to and operatively connecting the feed-wheel 14 and the feed-slide 15; a feed-slide actuator, (designated in a general way by G;) a feed-slide-advancing cam 18 in position and adapted for periodically engaging and operating the feed-slide actuator; a tool-carrier-actuating shaft $J^2$, carrying said cam; a retracting device 20 in connection with and adapted for automatically effecting a retractive movement of the feed-slide, and a feed-regulator (designated by R') in position and adapted for regulating the effective movement of the feed-slide and the resultant movement of the cutter-blank carrier.

The transmission device F, through which movement is transmitted from the feed-slide 15 to the feed-wheel 14, comprises in the form thereof herein shown two peripherally-toothed rotative members or clutch-wheels 21 and 22, having ratchet-toothed adjacent faces 21' and 22', respectively, normally held in operative engagement one with the other, preferably by means of a spring 24, and both members being rotatively mounted upon a relatively short shaft 23, journaled in bearings 23' upon the bracket 17. One of these clutch-wheels, as 22, meshes with the feed-wheel 14, and the other of said clutch-wheels, as 21, meshes with the teeth 15' of and is rotated by the feed slide or rack 15, as will be readily understood by a comparison of Figs. 7, 8, 14, and 18 of the drawings.

The actuator for the feed-slide in the form thereof herein shown consists of an actuating-rod 25, supported for reciprocative movement in bearings 26 and 26' upon the bracket 17, at one end of which rod is an antifriction-roller 27 in position and adapted to be engaged by the feed-cam 18 upon the cam-shaft or driven shaft $J^2$; a connection between the actuating-rod 25 and the feed-slide 15, which is shown consisting of an arm or bracket 28, secured to the outer end of the actuating-rod and engaging the end of a screw-threaded rod 29, which constitutes an extension of the feed-slide 15; an adjustable retracting device (designated in a general way by R) and consisting of a retracting-spring 20, carried upon the actuating-rod 25 intermediate to the bearings 26 and 26'; a tension-regulator 20', which is in the nature of a collar, adjustably carried upon the actuating-rod 25 in position and adapted for regulating the tension of the retracting-spring 20 and the return movement of the actuating-rod, and a feed-regulator R', which is herein shown as a stop-nut, adjustably carried upon the screw-threaded rod 29 of the feed-slide in position and adapted for engaging a fixed abutment, as the bracket 17, and for limiting the return stroke of said feed-slide and consequently the working stroke or advancing movement of the feed-wheel 14.

In the operation of the feed mechanism it will be observed that as the feed-cam 18 acts upon the actuating-rod 25 to effect through the medium of the connection a working stroke of the feed-slide, as will be understood by a comparison of Figs. 7 and 8 of the drawings, the two clutch-wheels 21 and 22 will be partially and simultaneously rotated in the direction of the arrow in said figure, which will advance the feed-wheel 14 a distance equal to a tooth arc. After the feed-cam 18 has passed from the position shown in Fig. 8 to that shown in Fig. 7 the feed-slide actuator will be immediately and automatically retracted by means of the retracting device R to the position shown in Fig. 7, and the clutch-wheel 21 will also be partially rotated in a reverse direction from that hereinbefore described without affecting the position of the clutch-wheel 22, owing to the overriding of the ratchet-teeth 21' and 22' of said wheels, the spring 24, as will be readily seen, permitting an overriding movement of one of said wheels relatively to the other.

When it is desired to change the working stroke of the feed-slide, it is simply necessary to adjust the feed regulator or nut R' upon the rod 29 of the feed-slide, this feed-regulator practically constituting an adjustable stop for limiting the return stroke of the feed-slide.

The locking device for the cutter-blank carrier, which device, as hereinbefore stated, is reciprocally effective and reciprocally operable with the feed mechanism, comprises in the form thereof herein shown a locking-wheel or stop-wheel 30, fixed upon the clamp member 2 of the blank-carrier C and having peripheral lock-notches 30', adapted to be successively entered by a lock-bolt; a reciprocative lock-bolt 31, which is shown supported in the slideway 32 on the bracket 17 in position and adapted for engaging successively in the lock-notches 30' and for locking the stop-wheel periodically against accidental rotation, and an actuating mechanism in connection with and in position and adapted for automatically and periodically actuating the lock-bolt to periodically engage and release the stop-wheel 30.

As a convenient means for normally retaining the lock-bolt 31 in locked engagement with the stop-wheel 30, there is provided, in connection with said lock-bolt, a spring-actuator, which in the form thereof herein shown consists of the springs 33, seated in openings 33' in the bracket 17 and bearing at their upper ends against projections 33'' upon the lock-bolt 31, said projection being herein shown as a pin extended transversely through the lock-bolt and projecting at either side thereof, as shown most clearly in Figs. 14 and 17 of the drawings.

As a convenient means for intermittently or periodically imparting a retractive or unlocking movement to the lock-bolt 31, I have provided a bolt-retracting cam 34, which is shown in the nature of a slide having a cam-face 34' and which is supported for reciprocatory movement in a slideway 34'', said cam-face 34' normally engaging a roller 35, carried upon a stud 35', fixed to the lock-bolt 31, as shown in Figs. 16 and 19. This cam-slide 34 is connected, by means of an arm 35'' at one end thereof, with a cam-slide actuator, (designated in a general way by H,) and which consists of a cam-slide-actuating rod 36, supported for reciprocative movement in bearings 36' and 36'' upon a bracket 17, said actuating-rod 36 preferably carrying a roller 37 at the end thereof in position and adapted to be engaged by the cam 38, secured to and rotating with the cam-shaft $J^2$.

As a means for automatically retracting or imparting a return stroke to the cam-slide, the actuating-rod 36 is provided with a retracting device S, which is substantially the same as the retracting device R used in connection with the actuating-rod 25 of the feed mechanism. This retracting device S consists of a spiral spring 37', carried upon the actuating-rod 36 and abutting at one end against a fixed bearing and at its opposite end against an adjusting device 37'', which adjusting device is in the nature of a collar adjustably secured, preferably by a set-screw, to said actuating-rod 36, as will be readily understood by reference to Figs. 14 and 16 of the drawings.

As a means for limiting or regulating the defective throw of the cam-slide, said cam-slide is provided at one end thereof with a screw-threaded extension 39, upon which is adjustably mounted a stop, which is in the nature of a collar 39', screwed upon the cam-slide extension, as shown in Fig. 14.

To secure the requisite reciprocal and alternately-effective operations of the feed mechanism and locking device, the feed-cam 18 and the unlocking-cam 38 are so disposed relatively upon the cam-shaft $J^2$ that the unlocking-cam will have a slight lead over the feed-cam, so that said unlocking-cam 38 will first act to operate the locking mechanism and disengage the lock-bolt from the stop-wheel and will hold said bolt in its unlocked position, as illustrated in Fig. 8 of the drawings, until the feed-cam inaugurates the operation of the feed mechanism, and then the feed-cam will complete the operation of the feed mechanism and advance the cutter-blank carrier a predetermined part of a complete rotation, after which the locking mechanism and feed mechanism will be successively returned to their normally locked and ineffective positions, respectively, as will be readily understood by a comparison of Figs. 7 and 8 of the drawings.

The compressor-tool T, which acts upon successive peripheral portions of the cutter-blank C', is adjustably carried for reciprocative movement at one side of the cutter-blank carrier C by a compressor-tool carrier or compound slide, (designated in a general way by T',) which comprises in the form thereof herein shown the three members 40, 40', and 40", respectively, the one, 40, of which is carried for reciprocation in guideways 41 and 41' upon the frame of the machine and constitutes a carriage for the two members 40' and 40", the member 40' being in the nature of a horizontal slide supported for horizontal adjustment in a slideway 42 in the front face of the member 40, and the member 40" being in the nature of a vertical slide or tool-rest and being supported for vertical adjustment in a slideway 42', formed in the front face of the chamber 40', this member 40" being provided with means for clamping the compressor-tool in place.

As a means for adjusting the member 40' relatively to the member 40, said member 40' is provided with a rack 43, which is engaged by a pinion 43', carried at the lower end of a stud 43", which is rotatively carried in a bearing formed in the member 40 and is provided at the upper end thereof with a hand-wheel 44, by means of which said pinion 43' may be rotated to effect a lateral adjustment of the compressor-tool relatively to the cutter-blank C', and as a means for effecting the vertical adjustment of the member 40" relatively to the member 40' to raise or lower the compressor-tool relatively to the axis of the cutter-blank an adjusting-screw 45 is carried by said member 40' and has a screw-threaded bearing in a fixture upon the member 40', as will be understood by reference to Figs. 25 to 27, inclusive, of the drawings.

As a convenient means for intermittently or periodically reciprocating the tool-carrier T', I have provided, in connection with the said carrier, a tool-carrier-actuating toggle, (designated in a general way by M,) comprising two toggle members 46 and 46', respectively, and an actuating member 46", the member 46 being pivotally connected, as shown at 47, to the tool-carrier T', the one, 46', being pivotally connected at 47' to a horizontally-movable toggle-block 48, adjustably carried upon the framework of the machine, and the member 46" being pivotally connected at its upper end to the two toggle members 46 and 46', and being carried at its lower end by a crank 49 of the shaft $J^2$, as will be readily understood by reference to Figs. 1, 6, and 7 of the drawings.

As a means for adjusting the toggle M to regulate the effective stroke of the tooth-forming compressor-tool T, the adjustable block 48 is preferably carried upon the end of the stud 48' and has its rear face inclined to form a bearing-face for a wedge 50, which is carried for vertical adjustment upon a bracket 50' and extends between the inclined face of the block 48 and the adjacent face of an abutment 51, which constitutes a portion of the framework of the machine. Bolts 48" are projected through elongated openings in the adjustable block 48 and are screwed into the framework of the machine to prevent accidental displacement of the block 48, as will be understood by reference to Figs. 1 and 6 of the drawings. By this construction and organization it will be seen that at each complete rotation of the shaft $J^2$ the tool-carrier T' makes one complete reciprocation, and it will also be seen that by adjusting the wedge 50 the working stroke of the toggle members 46 and 46' may be increased or decreased, as required.

In the manufacture of milling-cutters of the class specified by compression and with machines employing a rotative cutter-blank carrier or arbor and a reciprocative compressor-tool adapted for operation to successively compress successive peripheral tooth-forming portions of the blank no means has heretofore been provided, so far as I am aware, for fixedly supporting the cutter-blank at opposite sides and in close proximity to the periphery thereof to thereby reduce the stress upon the cutter-blank arbor during the compressing operation by the compressor-tool, which stress is under ordinary circumstances of such magnitude as to have a tendency to disalign the arbor, which would necessarily impair the precision of the cutter, and it is one of the chief objects of my present invention to provide means for clamping the cutter-blank at opposite sides near the periphery thereof, and to thereby reduce to a very great extent the injurious lateral stress upon the cutter-blank-carrying arbor.

To accomplish the end before noted I have provided an auxiliary intermittently-reciprocative clamp-closer E, which in the form thereof herein shown is in the nature of a follower or plunger supported for sliding movement in horizontal guideways 52 and 52' upon the frame of the machine and having at the forward end thereof a head 53 in axial alignment with and adapted for engaging the shiftable thrust-block 12, whereby said thrust-block will be carried forward during the advancing movement of the auxiliary clamp-closer, and thereby augment the pressure exerted upon the cutter-blank by further closing the clamp members 2 and 3 upon said blank, as will be readily understood by a comparison of Figs. 5 and 9 of the drawings. This auxiliary clamp-closer is intermittent in its operation, it having a working stroke intermediate to successive partial rotations of the cutter-blank and is intended to exert a relatively great pressure upon the clamp member as compared with the pressure exerted by the main closer 7, which main clamp-closer is normally continuous in its operation.

As a means for periodically or intermittently reciprocating the auxiliary clamp-closer E, which clamp-closer E is intended to intermittently augment the holding stress of the clamp members 2 and 3 upon the cutter-blank, I preferably employ in connection therewith auxiliary closer-actuating mechanism comprising in part a closer or follower actuating toggle, (designated in a general way by O,) which may be and is shown substantially of the same construction and general organization as the toggle M employed in connection with the compressor-tool carrier T', this toggle O consisting of the two toggle members 54 and 54' and the toggle-actuating member 54'' in pivotal connection with the two toggle members 54 and 54'. These toggle members 54 and 54' are shown pivotally connected, respectively, the first to the auxiliary closer or follower E and the second to a toggle-block 55, which constitutes one member of an adjusting device and is adjustably carried upon the framework of the machine. The actuating member 54'', which is pivotally connected at its upper end at 55' to the two toggle members 54 and 54', is preferably carried at its lower end upon a crank 56 upon the driven shaft J³, which constitutes one shaft of the main driving mechanism. As a convenient means for increasing or decreasing the effective throw of this toggle O to effect an increase or decrease in the intermittent closing movement of the clamp member 3 relatively to the clamp member 2, I have provided, in connection with the toggle O, a toggle-adjusting device, which for convenience is shown of substantially the same construction and organization as the toggle-adjusting device employed in connection with the compressor-tool carrier. This toggle-adjusting device for the toggle O comprises in the preferred form thereof herein shown a block 55, movably supported upon a pin or carrier secured to the framework, a wedge 57, carried for vertical adjustment upon a bracket 57' upon the frame of the machine and extending between the toggle-block, and an abutment 57'', (herein shown constituting a part of the framework,) as will be readily understood by reference to Fig. 5 of the drawings. This wedge 57 in the form thereof herein shown, as well as the wedge described in connection with the toggle M, is forked at its lower end, as shown at 58, and has a screw-threaded shank 58', which extends through a screw-threaded opening in the horizontally-projecting arm of the wedge-carrying bracket and is furnished with adjusting-nuts 59 and 59', one located above and the other below said bracket-arm, which nuts are adapted for adjusting the wedge and for holding the same in adjusted position.

The supporting means for the toggle-block 55 of the toggle O is shown similar to the supporting means for the toggle-block of the toggle M, and therefore need not be further described.

The main driving mechanism, through the instrumentality of which the cutter-blank feed mechanism, the compressor-tool-actuating mechanism, and the auxiliary clamp-closer-actuating mechanism are operated in the required order, comprises, in the organization thereof herein shown, a main driving-shaft J, carrying a suitable driving-pulley P at one end thereof, and two independently-rotative driven shafts J' and J², operatively connected with the driving-shaft J by means of suitable gearing so constructed and organized, as hereinafter described, as to effect a simultaneous rotation of the two driven shafts and so as to enable one of said driven shafts to be separately rotated, if desired. The driving-shaft, which is shown horizontally and transversely disposed relatively to the axial plane of the cutter-blank carrier, is supported in bearings 60 and 60' on the framework at one side and near one end of said framework. The driven shaft J' is shown supported at one side of and in parallelism with the driving-shaft J in bearings 61 and 61' upon the framework, and the driven shaft J², which is shown in horizontal disposition and at right angles relatively to the driven shaft J', is supported below and preferably in parallelism with the axis of the cutter-blank carrier in bearings 62 and 62' on the framework B, as shown in Figs. 1, 2, 3, and 5 of the drawings.

In the organization herein shown and described an operative connection is established between the driving-shaft J and the driven shaft J', respectively, by means of a pinion 63, carried by the shaft J, the teeth of which pinion mesh with the teeth of a spur-wheel 63', carried by the driven shaft J'; and for convenience the driven shaft J², instead of being directly connected with driving-shaft J, is indirectly connected therewith by means of a pair of intermeshing bevel-gears 64 and 65, one of which, as 64, is fixed upon the driven shaft J' and the other of which, as 65, is rotatively mounted upon the driven shaft J², as most clearly shown in Figs. 4 and 5. This bevel-gear or driven gear 65 is normally held in locked engagement, so as to rotate with the driven shaft J², by means of a clutch device, (designated in a general way by K,) as will be hereinafter more fully described.

In practice the driving-pulley P will be rotatively mounted upon the driving-shaft J and will be normally held in locked engagement with said driving-shaft, so as to rotate said shaft, by means of a clutch device, (designated in a general way by L,) which clutch device will preferably be similar to the clutch K, employed in connection with the driven shaft J².

Inasmuch as the two clutches K and L are substantially the same in construction and organization, a detailed description of one of said clutch devices will suffice for both.

In Figs. 20, 21, and 22 I have shown the clutch device in connection with the driven shaft J² and the revoluble member or bevel-gear 65, mounted upon said shaft. These figures are intended to illustrate the construction and organization of said clutch device, and its operative relation to two revoluble members, and it will be understood that a description of the parts illustrated in said Figs. 20, 21, and 22 is intended to apply to both clutch devices K and L, employed in connection with the driven and driving shafts J² and J, respectively. The clutch devices K and L in the form thereof herein shown have each a spring-actuated clutch-pin 66, carried in a groove 67, formed in the periphery of an enlarged portion 67' of the shaft J² and in position and adapted for entering a clutch-pin socket 68, formed in the inner face of the revoluble member or gear-wheel 65; a wedge-like actuator 69, carried in a slideway of a bracket 70, secured to the framework of the machine and in position and adapted for engaging and retracting the clutch-pin 66; a lifting device for the clutch-pin-actuating wedge; an automatically-operable holdback or detent in position and adapted for engaging and locking a clutch-pin actuator or wedge 69 in its operative or retractive position, and retracting mechanism controlled by the movement of the blank-carrier and in position and adapted for automatically retracting the holdback or detent device V to release the same from engagement with and allow the clutch-pin actuator to engage and retract the clutch-pin to throw said clutch-pin out of engagement with the gear-wheel 65.

The lifting devices for the clutch-pin actuators of the two clutches K and L are designated by U and U', respectively, and the holdback devices of the clutch-actuators for the two clutches K and L are designated by V and V', respectively.

As a convenient means for normally maintaining the clutch-pin 66 in locked engagement with the gear-wheel 65, said clutch-pin is provided with a push-spring 71, seated in an opening 72, formed in said clutch-pin and abutting at one end thereof against the clutch-pin and at the opposite end thereof against a fixed abutment 73 upon the enlarged portion 67' of the shaft J². The clutch-pin 66 has the outer face thereof curved to coincide with the periphery of the enlarged portion 67' and is let into said portion 67', so that the outer face of the forward end of said pin comes flush with and practically constitutes the continuation of the outer face of the enlarged portion 67', as shown most clearly in Figs. 20 and 21 of the drawings. Said clutch-pin 66 has a lateral projection 66' at the rearward end thereof, which projects beyond the face of the clutch-pin carrier or enlarged portion 67' of the shaft J² in position and adapted to be engaged during the rotation of the shaft J² by the wedge-like portion 69' of the clutch-pin actuator 69, said projection 66' having one face thereof beveled off to facilitate an unabrupt engagement of the actuator with said clutch-pin, as will be understood by reference to Fig. 23 of the drawings.

As a means for insuring an advancing movement of the clutch-pin actuator when released from engagement with the holdback device V or V', push-springs 74 are provided, which are seated in openings in the bracket 70 and bear against the laterally-projecting wedge-shaped end 69' of the clutch-pin actuator, as shown in Fig. 21 of the drawings.

The lifting device U or U' for the actuator 69 in the form thereof herein shown consists of a lifting-lever 75, fulcrumed approximately midway of its length upon the bracket 70 and adapted to bear at its inner end against the under face of an abutment or projection 76, carried upon the actuator near the upper end thereof, which abutment is herein shown as a roller carried upon the shank of a screw having a screw-threaded bearing in said actuator, said lever having a lever-operating rod 76' connected to the outer end thereof, which operating-rod may be connected at its lower end with and be operated by a suitable treadle. (Not shown.)

The holdback device or detent V or V' for the clutch-pin actuator will usually consist of a sliding bolt 77, supported for movement at right angles to the path of movement of the actuator in a bracket 78, secured to the framework of the machine (see Figs. 1, 20, and 22) and in position and adapted for engaging in a notch 79 in the actuator 69, springs 80 being provided for normally holding the bolt 77 in engagement with said actuator, as will be understood by reference to Fig. 24 in conjunction with Fig. 20, above referred to.

The retracting mechanism or the unlocking device for the holdback-bolts for the two clutch devices K and L, respectively, consists in the form thereof herein shown of two rock-shafts 81 and 82, respectively journaled in suitable bearings upon the upper side of the framework, and two reciprocative rods 83 and 84, respectively, one of which, as 83, is operatively connected at opposite ends thereof with cranks 85 and 86 at adjacent ends of the rock-shafts 81 and 82, respectively, while the other, as 84, is operatively connected at one end with and is adapted to be reciprocated by the rock-shaft 82, and has a cam-face at the opposite end thereof in engagement with a pin or abutment 77' upon the bolt 77 of the holdback V of the clutch L, and is adapted upon a rocking movement of the rock-shaft 82 for throwing said bolt out of engagement with the driving-pulley P. The rock-shaft 82 carries a rocker-arm 87 in position and adapted upon a rocking movement of said shaft for engaging the upwardly-projecting pin or abutment 77' upon the bolt 77 of the clutch device K and for retracting said bolt to release the same from engagement with the revoluble member or gear-wheel 65 upon the driven shaft $J^2$. The retracting members of the unlocking mechanism are so organized relatively to each other and relatively to the holdbacks or detents of the two clutches L and K, respectively, as to operate simultaneously to effect a simultaneous unlocking of the two clutches L and K, as will be understood by reference to Fig. 1 of the drawings.

As a means for positively actuating the clutch-unlocking mechanism to stop the machine at each complete revolution of the cutter-blank carrier, the stop-wheel or locking-wheel 30 is shown provided at one side thereof with a clutch-controlling projection 30'', and the rock-shaft 81 of the clutch-unlocking mechanism is shown provided at one end thereof with a laterally-projecting arm in position and adapted to be engaged and rocked by the projection 30'' upon the locking-wheel 30. By this construction and arrangement of unlocking mechanism for the two clutches K and L it will be seen that immediately after each complete rotation of the cutter-carrier the projection 30'' upon the locking-wheel of said carrier will engage the arm 81' upon the rock-shaft 81 and rock said shaft, and will through the medium of the rock-shaft 82 and the reciprocatory members 83 and 84 and the bolt-engaging devices immediately retract the holdback-bolt of both clutches K and L, allowing the clutch-pin actuator to drop from the position shown in Fig. 20 to that shown in Fig. 22 and retract the clutch-pins of said clutches, releasing said pins from engagement with the revoluble members P and 65, respectively, and thereby stop the machine.

A friction-brake 88 is preferably provided in connection with each clutch-pin actuator to limit the momentum thereof, and a brake (designated by W) is provided in connection with the driven shaft $J^2$ for stopping the rotation of said shaft immediately upon the release of the clutch L. This brake is herein shown in the nature of a wheel having an eccentric periphery which periodically engages a brake-shoe secured to the frame of the machine.

By the provision of two clutch devices, one of which is in connection with and controls the rotation of the driving-shaft J and the other of which is in connection with and controls the rotation of the driven shaft $J^2$, and by providing independent mechanism for each clutch adapted for effecting a locking operation of said clutch, it will be seen that the actuating mechanism for the auxiliary clamp-closer may be operated for further clamping or partially releasing the cutter-blank independent of the compressor-tool-actuating mechanism and while said mechanism is dormant or inoperative.

One of the chief objects in providing means for enabling the auxiliary clamp-closer-actuating mechanism to be independently operated is to facilitate an accurate adjustment in the co-operative relation of the auxiliary clamp-closer and compressor-tool carrier and to enable the auxiliary clamp-closer to be retracted and thrown out of operative engagement with the clamp at any time irrespective of the position of the compressor-tool, which is a matter of considerable importance, as it permits an accurate positioning of the several co-operative members, which is necessary to precision and operation.

The operation of the machine will be readily apparent to those skilled in the art by a comparison of the several figures of the drawings, and inasmuch as the process for making milling-cutters such as are made by my improved machine is fully described in Patent No. 408,446, hereinbefore referred to, it is deemed unnecessary to enter into a detailed description of the method of making such milling-cutters as carried out by my improved machine. The only difference in the method as carried out by my present invention over that described in the patent just referred to is that of exerting a pressure sidewise upon the blank near the periphery thereof which is in excess of the pressure exerted by the compressor-tool upon the periphery of said blank, so as to sustain the middle portion of the blank against distortion and also prevent the straining or disaligning of the blank-carrying arbor, which improvement in the process will constitute, in part the subject-matter of certain process claims herein.

By a comparison of the several figures of the drawings in connection with the foregoing description it will be seen that the clamp-rod 7, which is herein termed the "main clamp-closer," is hand-operated, and is normally continuous in its operation for holding the clamp-member 3 closed upon a cutter-blank supported between the two clamp-members 2 and 3 with a limited clamping stress, which stress is periodically augmented by the periodical working stroke of the auxiliary clamp-closer E, said auxiliary clamp-closer at each working stroke further closing the clamp member 3 relatively to the clamp member 2, thus temporarily nullifying the clamping stress of the main clamp-closer 7. Thus it will be seen that owing to the differential effective clamping actions of the main and auxiliary clamp-closers said clamp-closers are practically reciprocal in their effective actions upon the clamp members—that is to say, the former clamp-closer, which exerts the lesser closing stress upon the clamp member 3, is effective for clamping purposes when the auxiliary clamp-closer is in its retracted or ineffective position; but when the auxiliary clamp-closer is in its advanced or effective position said closer overcomes the clamping action of the main clamp-closer by reason of the excessive stress exerted, which temporarily renders the main clamp-closer ineffective in its clamping action, as it will be seen that when the auxiliary clamp-closer is shifted from the position shown in Fig. 5 to that shown in Fig. 9 it will further close the clamp member 3 relatively to the clamp member 2, which tends to relieve the pulling strain upon the main clamp closer or rod 7.

Having thus described my invention, I claim—

1. In a machine of the class specified, the combination with a blank-clamping device; of clamp-closing mechanism and feed mechanism in co-operative connection, and adapted for automatically and intermittently effecting a closing and rotating movement, alternately, of said blank-clamping device, substantially as described.

2. In a machine of the class specified, in combination, a reciprocative tooth-forming compressor-tool; means for intermittently reciprocating said compressor-tool; a blank-carrying and clamping device embodying two rotative and relatively-separable members; and means for automatically and intermittently closing, rotating, and releasing said members, substantially as described, and for the purpose set forth.

3. In a machine of the class specified, the combination with an intermittently-reciprocative compressor-tool; of an intermittently-rotative cutter-blank carrier embodying a blank-clamp; a normally continuously-effective clamp-closer; an intermittently-effective clamp-closer, said two clamp-closers having differentially-effective clamping actions; and means for automatically and reciprocally actuating the compressor-tool and the intermittently-effective clamp-closers, substantially as described, and for the purpose set forth.

4. In a machine of the class specified, the combination with a cutter-blank carrier embodying an intermittently-rotative and normally-continuous clamping device; an intermittently-reciprocating clamp-closer adapted for intermittently co-operating with the rotating clamping device intermediate to successive rotations thereof; and mechanism for automatically actuating said intermittently-reciprocating clamp-closer, substantially as described.

5. In a machine for making milling-cutters, in combination, a reciprocative tooth-forming compressor-tool; means for automatically and intermittently reciprocating said compressor-tool; and cutter-blank carrying and clamping mechanism consisting of a blank-clamp, two independently-operable and differentially-effective clamp-closers, and means for independently actuating said clamp-closers, substantially as described.

6. In a machine of the class specified, in combination, an intermittently-rotative cutter-blank carrier consisting of two longitudinally-separable clamp-members normally locked together for rotation, one with the other, and adapted for axially supporting and circumferentially clamping the cutter-blank, and one of which clamp-members is supported for longitudinal sliding movement relatively to the other clamp-member; and an intermittently-reciprocative clamp-closer; mechanism for automatically and intermittently reciprocating said clamp-closer to effect a clamping action of the clamp-member; and means for intermittently rotating the cutter-blank carrier, substantially as described.

7. In a machine of the class specified, the combination with the frame thereof; of a rotative cutter-blank-carrying clamp supported on said frame, for axially supporting and circumferentially clamping a cutter-blank, said clamp consisting of two longitudinally-separable members, one of which has a cutter-blank-carrying arbor at one end thereof of relatively-small diameter, and the other of which has an axial bore for receiving the end of said arbor, and both of which are normally locked together for rotation, one with the other; a clamp-closer for intermittently closing said members; and mechanism for automatically actuating said clamp-closer, substantially as described.

8. In a machine of the class specified, the combination with an intermittently-rotative cutter-blank carrier, embodying a blank-clamp; feed mechanism adapted for intermittently rotating the cutter-blank carrier a predetermined part of a complete rotation at each operation said of mechanism; and an intermittently and automatically reciprocative clamp-closer adapted for intermittently engaging and effecting a clamping action of the blank-clamp; and means for automatically actuating said clamp-closer, substantially as described.

9. In a machine of the class specified, in combination, an intermittently-rotative cutter-blank carrier, consisting of two separable clamp-members, normally locked together against rotative movement, relatively to each other; an intermittently-reciprocative clamp-member closer; means for intermittently rotating the cutter-blank carrier; and means for intermittently reciprocating the clamp-closer, intermediate to the effective operations of the feed mechanism, substantially as described, and for the purpose set forth.

10. In a machine for making milling-cutters, the combination with a reciprocative compressor-tool, and with means for intermittently reciprocating said compresser-tool; of an intermittently-rotative cutter-blank-carrying clamp, consisting of two longitudinally-separable members; means for intermittently rotating said cutter-blank-carrying clamp; and an intermittently and automatically reciprocative clamp-closer, in position and adapted for intermittently closing said clamp, to engage and release the blank, substantially as described.

11. In a machine of the class specified, the combination with an intermittently-rotative blank-carrier embodying a blank-clamp; of intermittently-operable indexing mechanism in operative connection with said carrier; an intermittently-reciprocative blank-closer reciprocally effective with the indexing mechanism for closing the blank clamp intermediate to successive effective operations of the indexing mechanism; and means for reciprocally actuating the indexing mechanism and the clamp-closer, substantially as described.

12. In a machine for making milling-cutters, in combination, two revoluble clamping-members, having means for supporting a cutter-blank at adjacent ends thereof; feed mechanism in operative connection with, and adapted for intermittently rotating, said clamping-members; a reciprocative clamp-closer, in position and adapted for intermittently closing said clamp-members, intermediate to successive rotations thereof; a reciprocative tooth-forming compressor-tool, in position and adapted for intermittently operating upon the blank, intermediate to successive rotations thereof; and actuating mechanism for the compressor-tool and its carrier, and in operative connection with the feed mechanism, and adapted for reciprocally effective operation, relatively to said feed mechanism, substantially as described, and for the purpose set forth.

13. In a machine for making milling-cutters, in combination, an intermittently-rotative blank-carrying clamp; intermittently-operable and reciprocally-effective blank-rotating mechanism and tooth-forming mechanism; a reciprocative clamp-closer, in position and adapted for intermittently closing the clamp, intermediate to intermittent rotations thereof; and means, in co-operative relation with the feed mechanism, and adapted for intermittently reciprocating said clamp-closer, substantially as described, and for the purpose set forth.

14. In a machine of the class specified, the combination with a frame; of a cutter-blank-carrying clamp, consisting of a non-reciprocative clamping-member and a reciprocative clamping-member adapted to be closed relatively to the other clamping-member, and both of which are journaled for coincident rotation in suitable bearings in the frame-work for removably supporting a cutter-blank between adjacent ends thereof, in combination with feed mechanism in operative connection with, and adapted for intermittently and simultaneously rotating, said clamping-members; and mechanism for automatically actuating said reciprocative clamping-member, substantially as described.

15. In a machine of the class specified, the combination with a frame; of a non-reciprocative clamping-member and a reciprocative clamping-member adapted to be automatically closed relatively to the other member, in operative connection with each other, and journaled for coincident rotation in suitable bearings in the frame-work; and also adapted for removably supporting a cutter-blank between the adjacent ends thereof; and a feed mechanism and a locking mechanism operatively connected with one of the clamping-members, and adapted for relatively reciprocal operation, to partially rotate said members, and lock the same against rotation alternately and intermittently, substantially as described.

16. In a machine of the class specified, the combination with an intermittently-rotative blank-clamp comprising two longitudinally-separable members; of a reciprocative blank-clamp closer in position and adapted for closing the clamp intermediate to intermittent rotations of said clamp; and mechanisms for automatically and reciprocally actuating the blank-clamp and clamp-closer, substantially as described, and for the purpose set forth.

17. In a machine of the class specified, the combination with two blank-carrying and clamping members; of means for intermittently rotating said members; reciprocating means for actuating one of said members; and mechanism for intermittently and automatically actuating said reciprocating means to impart a closing movement to said clamping-members, substantially as described.

18. In a machine of the class specified, a blank-carrying and clamping mechanism consisting of two intermittently-rotative and longitudinally-separable blank-carrying and clamping-members; an intermittently-reciprocative clamp-closer, in axial alignment with said two clamping-members; a transverse-shiftable thrust-block, normally supported between one of the rotative clamping-members and the reciprocative-clamp-closer; means for intermittently actuating said reciprocative clamp-closer; and means for intermittently rotating said two clamping-members, substantially as described, and for the purpose set forth.

19. In a machine of the class specified, the combination with an intermittently-rotative cutter-blank clamp; of an intermittently-effective feed mechanism in operative connection with said clamp; a locking device in operative connection with the clamp and the feed mechanism; and adapted for reciprocal operation with said feed mechanism; and automatically and intermittently operable blank-clamp closing mechanism in reciprocally co-operative relation with the feed mechanism, and adapted for intermittently and automatically closing the blank-clamp upon the blank carried by said clamp, intermediate to successive rotations thereof, substantially as described.

20. In a machine of the class specified, the combination with the frame-work thereof; of two axially-coincident blank-clamping and carrying members in normally locked engagement, and supported for simultaneous rotation in the frame-work of the machine, and adapted, one of them, for movement longitudinally of the other; and a clamp-closing device, in connection with said members, it consisting of a clamp-rod extending through one, and engaging the other of said members, means for actuating the clamp-rod, and means for intermittently rotating said clamp-members, substantially as described, and for the purpose set forth.

21. In a machine of the class specified, the combination with an intermittently-rotative cutter-blank carrier; of feed mechanism therefor, consisting of a feed-wheel carried by said blank-carrier; a feed-rack supported for reciprocation adjacent said feed-wheel; means between and operatively connecting said feed-wheel and feed-rack, and effective for rotating the feed-wheel upon the movement of the rack in one direction, and ineffective for rotating said feed-wheel on the movement of the rack in the opposite direction; and actuating mechanism in connection with and adapted for intermittently reciprocating said feed-rack, and embodying an actuating-rod and a cam-carrying shaft, substantially as described.

22. In a machine of the class specified, the combination with the rotative cutter-blank carrier, and with the feed-wheel carried thereby; of a reciprocatory feed-rack; means for intermittently-reciprocating said feed-rack; two revoluble clutch-members in operative connection with each other, and in mesh, one with the feed-wheel and the other with the rack; means in connection with and adapted for limiting the working stroke of the feed-rack, whereby the advancing movement of the carrier is regulated, substantially as described, and for the purpose set forth.

23. In a machine of the class specified, the combination with the intermittently-rotative cutter-blank carrier, of a peripherally-toothed feed-wheel and a peripherally-notched stop-wheel or locking-wheel, carried by said carrier; and intermittently-operable rack-and-pinion feed mechanism in operative connection with said feed-wheel, and adapted for intermittently rotating said feed-wheel a predetermined part of a complete rotation, at each operation of said feed mechanism; and an intermittently-operable locking mechanism in reciprocally-co-operative relation with the feed mechanism, and embodying a reciprocative locking-bolt in position, and adapted for successive engaging and releasing the stop-wheel, intermediate to successive intermittent rotations thereof, substantially as described, and for the purpose set forth.

24. In a machine of the class specified, the combination with the rotative cutter-blank carrier, and with the stop-wheel and feed-wheel, carried thereby; of a reciprocative locking-bolt, in position and adapted for intermittently engaging and releasing said stop-wheel; a rack-and-pinion feed device in operative connection with the feed-wheel, and embodying a clutch; and means in position and adapted for reciprocally, alternately, and intermittently effecting a working stroke of the locking device and a feed device, substantially as described, and for the purpose set forth.

25. In a machine of the class specified, the combination with the intermittently-rotative cutter-blank carrier and the feed-wheel carried thereby; of actuating mechanism for said feed-wheel, consisting of a reciprocable feed-rack; two gear wheels operatively connected together by the clutch, and meshing, one with the feed-wheel, and the other with the feed-rack; a spring-retracted actuating device in operative connection with the feed-rack; a cam, carried by a driven-shaft in position and adapted for intermittently advancing the feed-rack-actuating device, to intermittently rotate the cutter-blank carrier a predetermined part of a complete rotation, at each complete rotation of said cam; and regulating means in operative connection with said feed mechanism, and adapted for limiting the effective movement thereof, substantially as described, and for the purpose set forth.

26. In a machine of the class specified, the combination with a rotative cutter-blank carrier, and with a peripherally-notched stop-wheel carried by said carrier; of a spring-actuated locking-bolt in position and adapted for intermittently and successively engaging in successive notches in the stop-wheel; and an automatically and intermittently operable retracting device in operative connection with the locking-bolt, and embodying a bolt-retracting cam-slide supported for sliding movement transversely of the bolt; a rotative-cam; and a spring-retracted actuator between and operatively connecting the cam-slide and the rotative-cam, substantially as described.

27. In a machine of the class specified, the combination with the rotative cutter-blank carrier, and the peripherally-notched stop-wheel carried thereby; of a cam-actuated sliding-bolt, supported in position and adapted for intermittently and successively engaging in the successive notches of the stop-wheel; a bolt-retracting cam-slide supported for sliding movement transversely of the bolt; and means directly connected with said cam-slide, and adapted for limiting the working-stroke of said locking-bolt; and means for operating said cam-slide, substantially as described.

28. In a machine for making milling-cutters, in combination, an intermittently revoluble cutter-blank-carrying clamp; a reciprocative tooth-forming compressor-tool carrier; an intermittently-reciprocative clamp-closer, in position and adapted for intermittent co-operation with the blank-carrying clamp; a toggle, in operative connection with and adapted for actuating the compressor-tool carrier; a toggle in operative connection with the reciprocative clamp-closer; two angularly-disposed driven-shafts connected, respectively, by means of crank-connections to the compressor-tool-carrier actuating-toggle, and to the reciprocative clamp-closer actuating toggle, respectively, and operatively connected together by means of gears; a driving-shaft operatively connected by means of gears with one of said driven-shafts; and reciprocally-operable blank-carrier feeding and stopping mechanism in operative connection with one of the driven-shafts, and adapted for intermittently rotating and intermittently stopping the blank-carrier, substantially as described, and for the purpose set forth.

29. In a machine for making milling-cutters, the combination with the rotative blank-carrying clamp; the reciprocative-clamp-closer, and the reciprocative compressor-tool carrier; of driving or actuating mechanism therefor, consisting of a driving-shaft, having a driving-wheel revolubly mounted thereon; a clutch operatively connecting said driving-wheel and driving-shaft; a driven-shaft in operative connection with the driving-shaft and with the reciprocative-clamp-closer, and carrying a bevel-gear; a rectangularly-disposed driven-shaft, revolubly carrying a bevel-gear in mesh with the bevel-gear of the first-mentioned driven-shaft, and operatively connected with the compressor-tool; a clutch intermediate to, and normally operatively connecting the bevel-gear and last-mentioned shaft; feed mechanism and locking mechanism in operative connection with the blank-carrier and one of the driven-shafts; an automatically-operable clutch-actuating mechanism in operative connection with the two clutches and with an actuating-member carried by the blank-carrier, and adapted, upon each complete rotation of said carrier, to operate the clutches, and stop the machine, substantially as described.

30. In a machine of the class specified, the combination with a rotative blank-clamp; of an intermittently-operable clamp-closing mechanism and an intermittently-operable feed mechanism in operative connection, one with the other, and adapted, the former, for intermittently effecting a closing movement of the blank-clamp, and the latter for intermittently rotating said blank-clamp; adjusting means in operative connection with the clamp-closing mechanism, and adapted for regulating the closing movement of the clamp; and driving mechanism operatively connecting and actuating the clamp-closing mechanism and the feed mechanism, substantially as described, and for the purpose set forth.

31. In a machine for making milling-cutters, the combination with the intermittently-rotative cutter-blank carrier and its actuating mechanism; and with the reciprocative compressor-tool carrier and its actuating mechanism; and with the reciprocative-clamp-closer and its actuating mechanism; of an adjusting device in operative connection with and adapted for regulating the working stroke of the feed mechanism; an adjusting device in operative connection with and adapted for regulating the working stroke of the tool-carrier-actuating mechanism; and an adjusting device in operative connection with and adapted for regulating the working stroke of the reciprocative-clamp-closer, and all of which adjusting devices are operable to effect a co-operative adjustment of said mechanisms, substantially as described, and for the purpose set forth.

32. In a machine of the class specified, the combination with a rotative blank-carrier embodying a blank-clamp and adapted to support a blank; of an intermittently-operable blank-feed in operative connection with said blank-carrier, and adapted for intermittently rotating said carrier; a clamp-closer adapted for intermittently closing said clamp; and feed-actuating and clamp-closer operating mechanism in operative connection with said blank feed and clamp-closer and with each other, and adapted for automatically and reciprocally actuating said feed and clamp-closer, substantially as described.

33. In a machine of the class specified, the combination with a cutter-blank-carrying clamp comprising two clamping-members; of two independent clamp-closing devices of relatively-varying efficiencies, substantially as described.

34. In a machine of the class specified, the combination with the clamping-members; of a normally continuously-effective clamp-closer, and means for operating the same; an intermittently-effective clamp-closer, and mechanism for automatically operating said intermittently-operative clamp-closer, substantially as described.

35. In a machine for making milling-cutters, the combination with a blank-clamp, embodying blank-carrying means comprising two longitudinally-separable clamp-members; of an intermittently and automatically reciprocative blank-clamp closer; an intermittently-reciprocative compressor-tool carrier; means for automatically actuating the blank-clamp closer; and means for automatically and intermittently actuating the compressor-tool carrier simultaneously with the effective operation of the blank-clamp closer, substantially as described, and for the purpose set forth.

36. In a machine for making milling-cutters, the combination with the blank-carrier embodying two rotative and longitudinally-separable clamp-members, and with means for intermittently rotating said clamp-members; of two independent clamp-closing devices, one of which is adjustably connected with one of said clamp-members and rotates with the carrier, and the other of which intermittently engages one of said clamp-members to effect a closing movement of said member relatively to the other member; means for actuating the former clamp-closer; and means for intermittently and automatically actuating the latter clamp-closer, substantially as described, and for the purpose set forth.

CHARLES C. TYLER.

Witnesses:
FRED. J. DOLE,
EMORY C. WHITNEY.